United States Patent
Takeda et al.

[15] 3,656,153
[45] Apr. 11, 1972

[54] ANALOGUE-DIGITAL CONVERTING APPARATUS

[72] Inventors: Ikuo Takeda; Takashi Suzuki; Hikaru Furukawa, all of Tokyo, Japan

[73] Assignee: Takeda Riken Industry Company Limited, Tokyo, Japan

[22] Filed: Apr. 7, 1970

[21] Appl. No.: 26,301

[30] Foreign Application Priority Data

Apr. 9, 1969   Japan..................................44/26858

[52] U.S. Cl. ..................................................340/347 AD
[51] Int. Cl. .......................................................H03k 13/02
[58] Field of Search ..........................340/347 AD; 235/154

[56] References Cited

UNITED STATES PATENTS 3,522,598   8/1970   Sokolich .......................340/347 AD

*Primary Examiner*—Maynard R. Wilbur
*Assistant Examiner*—J. Glassman
*Attorney*—William J. Daniel

[57] ABSTRACT

This disclosure is an analogue-digital converting apparatus wherein a magnetic core is provided with an input winding, a variable winding in which the number of turns can be changed, a fixed winding of a constant number of turns, and the core also having a magnetic flux detecting winding, these windings being coupled to appropriate circuitry such that, as detected by the flux winding, a flux developed in the core by a current in the input winding can be balanced by current introduced in the fixed and variable windings, the latter current being displayed digitally such that its magnitude can be read with a high precision of more than 8 to 9 digits to represent the magnitude of the input current.

1 Claims, 3 Drawing Figures

ANALOGUE-DIGITAL CONVERTING APPARATUS

This invention relates to an analogue-digital converting apparatus.

The prior art includes both a comparing system and an integrating system which can serve as an analogue-digital converting apparatus, for example, for use as a digital voltmeter. An apparatus of high precision and high sensitivity in which the time required for each measurement is short can be obtained by using a combination of both of the systems. That is to say, the more significant or higher digits are converted to digital quantities and then by the comparing system, the converted digital value is again converted back to an analogue quantity and the difference between the input quantity to be measured and this again converted quantity is converted to a digital quantity by the integrating system to obtain less significant or lower digits.

However, since in such a circuit a resistance divider is used to convert the digital quantity back to an analogue quantity the latter conversion is, influenced by the precision and stability of the resistance, and it is thus difficult to obtain a high precision better than about several decimal places. According to other teachings improvement was had by making the number of turns of a comparing winding variable by providing the magnetic core with an input analogue winding, the input current then being determined by changing the number of turns in the comparing winding while inserting a fixed reference current in the comparing winding and reversing the directions of its generated magnetic flux with respect to the input current flux so that the magnetic flux in the magnetic core could be cancelled out, a digital representation of the magnitude of to the input current being obtained based upon the number of said turns. Because of the fact that the current is proportional to the number of turns of the variable winding, this apparatus is very stable. As no such active element as a transistor or resistance is used, it is less noisy and has very high sensitivity. However, since there is a limit to the number of turns of the winding, it has been difficult to increase the number of digits available from such a conversion of an analog quantity.

The present invention is to provide a magnetic core with an input winding, a variable winding in which the number of turns can be changed, combined with a fixed winding having a fixed number of turns and a magnetic flux detecting winding.

Therefore, an object of the present invention is to provide an analogue-digital converting apparatus which has high precision of more than 8 to 9 digits, has a high in sensitivity, is short measuring time, is very stable and is simple to manufacture.

Figure 1:
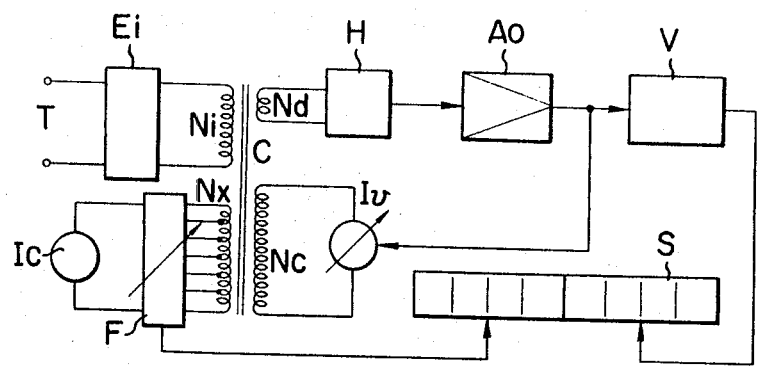
FIG. 1 is a diagram for explaining the principle of the apparatus of the present invention.

In FIG. 1, which is a block diagram useful for explaining the principle of the present invention, a magnetic core C is provided with an input winding $Ni$, a variable winding $Nx$ having many taps, a fixed winding $Nc$ having a constant number of turns and a magnetic flux detecting winding $Nd$. An electric current proportional to a voltage to be converted at a terminal T is added to the input winding $Ni$ through a voltage-current converter $Ei$, and a constant reference current is also added to the variable winding $Nx$ through a tap switch F from a constant current source $Ic$. Further, the output current of a variable current source $Iv$ is passed through the fixed winding $Nc$, and a magnetic flux detector H connected to a magnetic flux detecting winding $Nd$ detects the resultant flux in the core C. Therefore, when a direct current voltage to be converted is applied to the terminal T with such polarity as will induce via the winding $Ni$ a magnetic flux in the magnetic core C which opposes the flux induced by the winding $Nx$, the detector H sends out a voltage corresponding to the difference between the magnetomotive forces of the above mentioned two windings. After this voltage is amplified by an amplifier $Ao$ it then controls the input from the variable current source $Iv$ such that the latter's output current flows through the winding $Nc$ and further bucks out the above mentioned remaining magnetomotive force. That is to say, when the currents of the windings $Ni$, $Nx$ and $Nc$ are respectively $i_i$, $i_x$ and $i_c$, and their numbers of turns are respectively $n_i$, $n_x$ and $n_c$, and the conversion coefficient for converting their resultant magnetomotive forces to current in the winding $Nc$ is K, the expression $$k(n_i i_i - n_x i_x - n_c i_c) = i_c \quad (1)$$

holds, and therefore, if the coefficient $k$ is made large enough by the amplification by the amplifier $A_o$, then $$n_i i_i = n_x i_x + n_c i_c \quad (2)$$

Therefore, if the conversion coefficient of the converter $Ei$ is $1/r$, the voltage $e$ at the terminal T is represented by $$e = (r i_x/n_i) \cdot n_x + (r n_c/n_i) i_c \quad (3)$$

However, since the conversion coefficient $1/r$, as well as the respective numbers of turns $n_i$ and $n_c$ of the windings $Ni$ and $Nc$ and the current $i_x$ of the wind $Nx$ are all constant, and if the quantities $r i_x/n_i$ and $r n_c/n_i$ are respectively represented by constants $\alpha$ and $\beta$, the voltage can by represented by $$e = \alpha n_x + \beta i_c \quad (4)$$

Therefore, when the constants $\alpha$ and $\beta$ are properly selected, a digital signal proportional to the number of winds $n_x$ can be taken from the position of switch F to obtain more significant or higher digit of a scaler S. At the same time, when, for example, the flux representing output of the amplifier $Ao$ is inserted in the analogue-digital converter V to convert the current through the winding $Nc$ to a digital quantity and this quantity is applied in digital form as the lower digits of the above mentioned scaler S, the input voltage $e$ can thus be displayed as a digital quantity.

As described above, in the apparatus of the present invention, digital representations of the higher digits are obtained by the selected position of the switch F selecting the number of turns of the winding, where as digital representations of the lower digits are obtained, for example, by the use of a conventional integrating analogue-digital converter to provide less significant digits to be added to or subtracted from them. Therefore, a digital quantity of 8 to 9 digits can be easily obtained with a comparatively small number of variable winding turns, and the integrating time is not required to be greatly increased, each measurement being made within a short time. Further, as the precision is determined by the stability of the upper digits during the integrating period required for obtaining the lower digits this stability will be great since the variable winding $Nx$ is connected to a constant current source whose current can be kept stable during a comparatively short measuring time. Moreover, as the variable value $n_x$ itself comprises a number of turns exhibiting no fluctuation in its value. Therefore a conversion of very high stability and precision is possible. Further, as the adjustment is made to eliminate the magnetic flux in the magnetic core, there is a perfectly linear relation.

Therefore, merely by appropriate calibration of the full scale, any desired precision can be obtained over the entire range of the measurement. By the way, the magnetic core C generates noise based on the Barkhausen effect but this noise is small as compared with the influence of thermal noise of the resistances or the like. Further, when the current $i_c$ is converted to a digital quantity by using an integrating converter as described above, the influence of the above mentioned noise is also removed. Since the input terminal T is only connected to the winding $Ni$, its D.C. potential level can be freely selected without regard to that of the other circuits and, by short-circuiting this input terminal, drift compensation within the circuit can be made.

Figure 2:
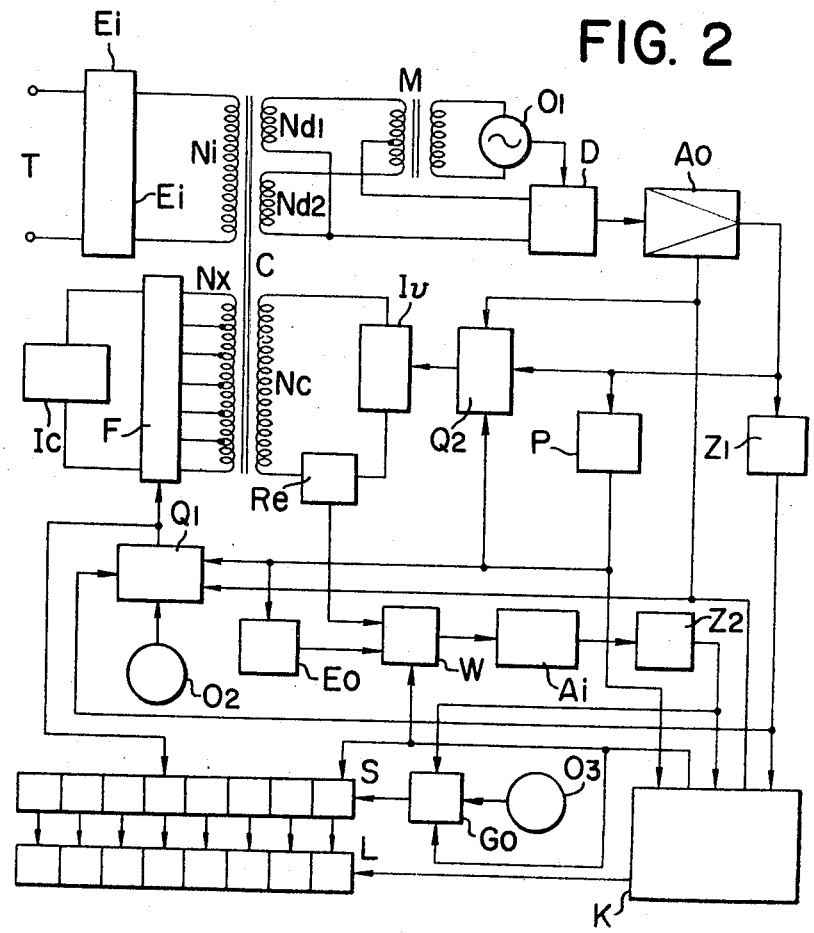
FIG. 2 is a diagram showing one embodiment of the present invention.

In FIG. 2 which shows a practical embodiment of the present invention, similar to that in FIG. 1, there is provided a magnetic core C with an input winding $Ni$, a variable winding $Nx$ having many taps, a fixed winding $Nc$ having a constant number of winds, and the two detecting windings $Nd_1$ and $Nd_2$ having the same number of turns connected in series opposition. The winding Ni is connected to the input terminal T of the voltage to be converted through a voltage-current converter Ei and the winding Nx is connected to a constant current source Ic through a tap switch F. Further, the fixed winding Nc is connected to a variable current source Iv through a resistor Re and both ends of the detecting windings $Nd_1$ and $Nd_2$ are connected to both ends of the secondary winding of a transformer M. The output of an oscillator $O_1$ is added to the primary winding of this transformer M and the voltage between the neutral point of the above mentioned secondary winding and the junction of the windings $Nd_1$ and $Nd_2$ is added to a demodulator D so as to be detected as combined with the output of the oscillator $O_1$. That is to say, in case no magnetic flux is produced in the magnetic core C, the impedances of the windings $Nd_1$ and $Nd_2$ are equal to each other and therefore no input appears at the demodulator but, when a direct current magnetic flux is produced in said magnetic core, an unbalance is produced and an input appears which is modulated depending on the direction of the above mentioned magnetic flux. As this modulated input is demodulated, a direct current voltage of a polarity corresponding to the direction of the direct current magnetic flux in the magnetic core C is delivered from the demodulator D to the amplifier $A_o$.

When an analog-digital converting operation is started, first a signal is issued from a controller K to the above mentioned amplifier $A_o$ and to operators $Q_1$ and $Q_2$ for a fixed short time to reduce the amplification of said amplifier Ao and to enable the operator $Q_1$ to block the operation of the operator $Q_2$. Further, a polarity detector P detects the output polarity of the amplifier Ao and therefore the direction of the magnetic flux in the magnetic core C and delivers the detected polarity to the operator $Q_1$ and the controller K. A pulse generator $O_2$ sends out a pulse with a proper period and the pulse drives the operator $Q_1$. That is to say, whenever the pulse is delivered, the operator $Q_1$ steps a switch F to switch the tap of the winding Nx in a direction dependent upon to the magnetic flux of the magnetic core C. Therefore, the magnetic flux of said magnetic core is increasingly cancelled and the output of the amplifier Ao reduces. The detector $Z_1$ detects the output level of the amplifier Ao. When the output reaches the zero level, the detector Z, actuates the controller K to deliver a signal to the operator $Q_1$ to stop the step switching operation. Therefore, the number of turns selected for said winding Nx is adjusted so that the input magnetic flux produced in the magnetic core C by the flux contributed by the winding Ni as a result of input from the terminal T through the converter Ei will be substantially canceled by the magnetic flux produced by the current added by the winding Nx driven by the constant current source Ic. Further, in this state, since the operation of the operator $Q_2$ is blocked, the current of the fixed winding Nc is zero. Whenever a pulsed switching signal is added to the switch F as described above from the operator $Q_1$, said pulse signal is also introduced into a higher digit for example, the fifth digit, of the scaler S and therefore the digital value corresponding to the number of turns of the winding Nx is counted by the 5th, 6th, 7th and 8th digits of said scaler. When said output signal of the detector $Z_1$ is added to the controller K, the conversion of said higher digits has been completed and said controller changes over to another operating state, preparing for the measurement of the lower digits.

When the signal delivered to the amplifier Ao and operators $Q_1$ and $Q_2$ from the controller K vanishes, the amplification of the amplifier Ao increases, the operation of the operator $Q_1$ is blocked so that the winding Nx keeps constant the number of turns selected as is described above, and the operator $Q_2$ of the variable current source Iv starts the operation. Further, since the output signal of the polarity detector P is also delivered to the operator $Q_2$, a current of such polarity as will back the residual magnetic flux in the magnetic core C will be caused to flow through the fixed winding Nc. Therefore, the magnetic flux of the magnetic core C will be further reduced and will become stable such that the above mentioned first formula will hold. A voltage drop corresponding to current of the winding Nc in this state will occur across the resistor Re and a proportional voltage thereto will be introduced into an integrator Ai through a switch circuit W. That is to say, the integrator Ai starts the integration of the current in the winding Nc but, after the lapse of a fixed time a signal will be delivered to the switch circuit W and to a gate circuit Go from the controller K, such that when the integrator Ai begins to integrate the voltage of a reference voltage source Eo, the gate circuit Go will open and the output of a pulse oscillator $O_3$ will be added to the lowermost digit of the scaler S. Further, since the output signal of the polarity detector P is added to the voltage source Eo, a reference voltage of such polarity as will reduce the output of the integrator is sent out. That is to say, after integrating the current of the winding Nc for a fixed time, the integrator Ai begins to integrate a reference voltage of such polarity that the integrated value reduces. Therefore, simultaneously with the beginning of the integration of the reference voltage, the lower digit of the scaler S begins to add or subtract the counts introduced the output pulses of the reference oscillator $O_3$ in response to the signal sent out of the controller K. The output of the integrator Ai is added to a level detector $Z_2$, and this output of said integrator gradually reduces. When output of said integrator reaches the zero level, a signal is added to the gate circuit Go to close it. Therefore, the lower digits of the scaler S retain the count representing a digital value proportional to the current in the winding Nc. As the detector $Z_2$ issues its zero-level output signal also to the controller K, i.e. simultaneously with the completion of the counting, an enabling signal is delivered to an indicator L from the controller K and the digital count in the scaler S is transferred to said indicator for display.

Figure 3:
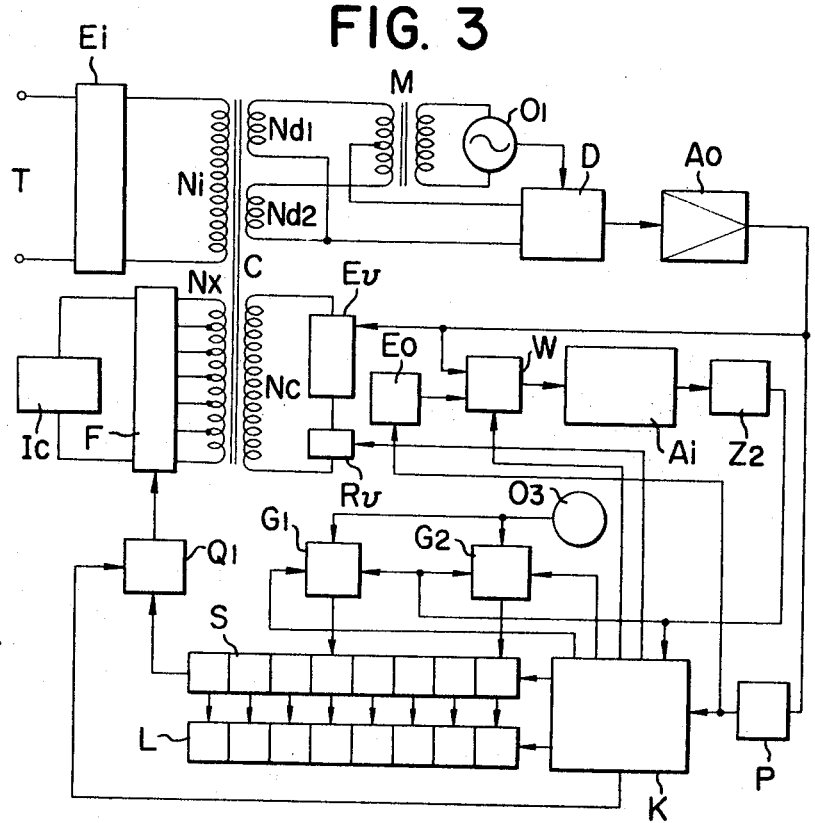
FIG. 3 is a diagram showing another embodiment of the present invention.

In FIG. 3 which is another embodiment of the present invention, a fixed winding Nc on a magnetic core C is connected to a variable voltage source Ev throuth a two stage switching resistor Rv of a high resistance and low resistance. First, a signal is added to this resistor Rv from a controller K and its resistance value is set at a low value. Further, an operator $Q_1$ remains in inoperative state and a variable winding Nx is disconnected from a constant current source Ic. In this state, as the output of an amplifier Ao control the variable voltage source Ev, a current in the direction effective to break the magnetic flux of the magnetic core C flows through the winding Nc and said magnetic flux is opposed and substantially eliminated. The output voltage of the amplifier Ao is delivered to an integrator Ai through a switch circuit W. When a fixed time has elapsed, a signal is added to the above mentioned switch circuit from the controller K and the input of the integrator Ai is switched over to the output voltage of a reference voltage source Eo. Further, a polarity detector P detects the output polarity of the amplifier Ao and adds its delivers a signal indicating polarity to the reference voltage source Eo. That said voltage source sends out a reference voltage of such polarity as reduces the output of the integrator Ai. That is to say, after the integrator Ai integrates a voltage proportional to the current of the winding Nc for a fixed time, its input is switched over to its reference voltage and the output voltage begins to reduce. Also, simultaneously with the switching of the switch circuit W, a signal is added to a gate circuit $G_1$ from the controller K, and the gate circuit opens and therefore the output of the reference oscillator $O_3$ steps the higher digits of the scaler S, for example, beginning with the fifth digit of the scaler S. When the output of the integrator Ai reaches the zero level, a signal is sent out of a level detector $Z_2$ to block the above mentioned gate circuit $G_1$. Therefore, a digital value proportional to the current of the winding Nc is counted by the 5th, 6th, 7th and 8th digits of the scaler. After this operation is completed, a signal enables the operator $Q_1$ from the controller K in response to the signal of the detector $Z_2$, and the switch F operates to change the number of turns of the winding Nx to a value proportional to the above mentioned digital value. At the same time, the signal is added to a resistor Rv from the controller K to switch its resistance value over to a higher value. Therefore, the current of the winding Nc reduces to a very small value leaving the magnetic flux of the input winding Ni to be substantially canceled by the magnetic flux of the winding Nx. Further, since the voltage source Ev is controlled by the output of the amplifier Ao, the current of the winding Nc will be adjusted to be of such value as more precisely eliminates the magnetic flux of the magnetic core C. Simultaneously with the enabling of the operator $Q_1$, the signal enabling the switch circuit W from the controller K also vanishes. Therefore, the output voltage of the amplifier Ao in the above described state is added to the integrator Ai. When a fixed time has elapsed, a signal is again added to the switch circuit W and the output of the reference voltage source Eo is connected to the integrator Ai. Therefore, the output of said integrator Ai begins to decrease, and at the same time a signal enables the gate circuit $G_2$ from the controller K, this gate circuit opens and therefore the output of the reference oscillator $O_3$ is inserted to count up the lowermost digit of the scaler S. The controller K sets the above mentioned scaler S to perform either addition or subtraction in response to the output signal of the polarity detector P. When the output of the integrator Ai reaches the zero level, a signal is sent out of the detector $Z_2$, the gate circuit $G_2$ closes and therefore a digital value proportional to the current of the winding Nc has been counted by the 1st, 2nd, 3rd and 4th digits of the scaler S. When this operation ends, a signal enables the indicator L from the controller K and the digital value in the scaler S is transferred to said indicator for display. Although the embodiments show windings used to detect core flux, other means such as Hall Effect detector means can be used.

What is claimed is:

1. An analog-digital converting apparatus comprising a magnetic core having an input winding and having a variable winding in which the number of turns can be changed and having a fixed winding; magnetic flux detecting means for detecting the flux in the core; means for coupling an input signal to be converted into said variable winding; means to change the number of turns of the variable winding to substantially cancel the flux in the core attributable to said input signal; means for adjusting the current of said fixed winding to fully cancel out any residual magnetic flux in the core as detected by said detecting means; and means for determining a multiple-digit representation including more-significant digits whose value is proportional to the number of turns of said variable winding and including less-significant digits whose value is proportional to the adjusted current in said fixed winding.

* * * * *

UNITED STATES PATENT OFFICE
CERTIFICATE OF CORRECTION

Patent No. 3,656,153　　　　　Dated April 11, 1972

Inventor(s) Ikuo TAKEDA et al

It is certified that error appears in the above-identified patent and that said Letters Patent are hereby corrected as shown below:

Column 6, Claim 1, line 13, change "variable" to -- input --.

Signed and sealed this 15th day of August 1972.

(SEAL)
Attest:

EDWARD M. FLETCHER, JR.　　　　　ROBERT GOTTSCHALK
Attesting Officer　　　　　　　　　Commissioner of Patents